United States Patent
Cross et al.

(10) Patent No.: US 11,613,655 B2
(45) Date of Patent: Mar. 28, 2023

(54) SYSTEMS AND METHODS FOR MAKING THERMOPLASTIC PRODUCTS AND COMPOSITIONS

(71) Applicant: Ennis-Flint, Inc., Greensboro, NC (US)

(72) Inventors: Nathan Hoover Cross, Greensboro, NC (US); Alex Cady, High Point, NC (US); Bradley Hepler, Lexington, NC (US); Andy Parker, Jamestown, NC (US); Vince Wilkins, Smyrna, GA (US)

(73) Assignee: Ennis-Flint, Inc., Greensboro, NC (US)

( * ) Notice: Subject to any disclaimer, the term of this patent is extended or adjusted under 35 U.S.C. 154(b) by 437 days.

(21) Appl. No.: 16/743,493

(22) Filed: Jan. 15, 2020

(65) Prior Publication Data

US 2020/0224039 A1 Jul. 16, 2020

Related U.S. Application Data

(60) Provisional application No. 62/792,625, filed on Jan. 15, 2019.

(51) Int. Cl.
| | | |
|---|---|---|
| *C09D 5/33* | (2006.01) | |
| *E01F 9/518* | (2016.01) | |
| *C09D 123/16* | (2006.01) | |

(52) U.S. Cl.
CPC ........... *C09D 5/004* (2013.01); *C09D 123/16* (2013.01); *E01F 9/518* (2016.02)

(58) Field of Classification Search
CPC ........ C09D 5/004; C09D 123/16; E01F 9/518
USPC ....................................................... 523/172
See application file for complete search history.

(56) References Cited

U.S. PATENT DOCUMENTS

| | | | |
|---|---|---|---|
| 5,148,943 A | 9/1992 | Moller | |
| 8,680,201 B2 | 3/2014 | Seidel et al. | |
| 2007/0244264 A1* | 10/2007 | Granger | B01F 33/8052 525/331.7 |
| 2008/0197523 A1* | 8/2008 | Heigel | B29C 41/36 425/116 |
| 2016/0024338 A1* | 1/2016 | Puffer, Sr. | C09D 167/08 523/172 |
| 2016/0032542 A1* | 2/2016 | Crocker | E01C 19/08 404/95 |
| 2016/0186396 A1* | 6/2016 | Hepler | E01F 9/506 523/150 |

FOREIGN PATENT DOCUMENTS

| | | | |
|---|---|---|---|
| DE | 3303766 A1 | 8/1984 | |
| DE | 19939042 A1 | 8/2001 | |
| GB | 2087247 A * | 5/1982 | ............. B01F 13/10 |
| KR | 20130027590 A | 3/2013 | |
| WO | 2016/087566 A1 | 6/2016 | |

OTHER PUBLICATIONS

PCT/US2020/013660, "International Search Report and Written Opinion", dated Apr. 28, 2020, 15 pages.

* cited by examiner

*Primary Examiner* — Hui H Chin

(74) *Attorney, Agent, or Firm* — Kilpatrick Townsend & Stockton LLP

(57) ABSTRACT

Thermoplastic compositions useful for roadway markings may be produced using a continuous systems and process methods that can reduce costs and improve product quality. Systems may comprise a feed system comprising a plurality of feeders and a mixing system comprising a mixer and a smoothing system. Each feeder may be configured to discharge a material at a feed rate according to a selected product formulation The mixing system may be configured to receive, heat, and combine the materials to produce a thermoplastic material, and discharge the thermoplastic material at a determined discharge rate.

15 Claims, 9 Drawing Sheets

SYSTEMS AND METHODS FOR MAKING THERMOPLASTIC PRODUCTS AND COMPOSITIONS

PRIORITY

This application claims priority to U.S. Provisional Application No. 62/792,625, filed on Jan. 15, 2019, which is incorporated herein by reference in its entirety.

FIELD

Described herein are systems and methods for producing a thermoplastic composition. In some aspects, the compositions described herein can be useful for roadway markings.

BACKGROUND

Thermoplastic materials are used for roadway markings and can be produced in a myriad of colors and patterns. Conventional systems for producing thermoplastics for roadway markings utilize batch processing that produce standard volumes of material according to the equipment restraints of the system. For example, the system may have a maximum batch size based on a maximum volume of the mixing vessel or a minimum batch size based on the agitation level or thermal capability of the system.

SUMMARY

This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

Described herein are systems and methods for continuous production of thermoplastic compositions useful for roadway markings. A continuous process can minimize batch-to-batch variability to improve product quality, reduce production costs, eliminate batch size constraints, and increase product offerings available.

In some examples, a system for producing thermoplastic material for roadway markings, the system can comprise a feed system comprising a plurality of feeders, where each feeder may be configured to discharge a material at a feed rate according to a selected product formulation, and a mixing system configured to receive, heat, and combine the materials to produce a thermoplastic material, and discharge the thermoplastic material at a determined discharge rate. In certain examples, the system may further comprise a transport system configured to receive the materials from the feed system and transport the materials to the mixing system.

Also described are methods to make the thermoplastic compositions described herein. In some examples, a method for producing thermoplastic composition for roadway markings may comprise charging a feed system comprising a plurality of feeders with components of the thermoplastic composition, discharging the components from the feeders at a determined feed rate, feeding the components to a mixing system, mixing and heating the components in the mixing system, and discharging the thermoplastic composition. In some examples, the mixing system may comprise a mixer and a smoothing system. Optionally, the method may further comprise blending at least a portion of the components in the smoothing system prior and feeding the blended components to the mixer.

The details of one or more embodiments are set forth in the description below. Other features, objects, and advantages will be apparent from the description and from the claims.

DETAILED DESCRIPTION

Figure 1:
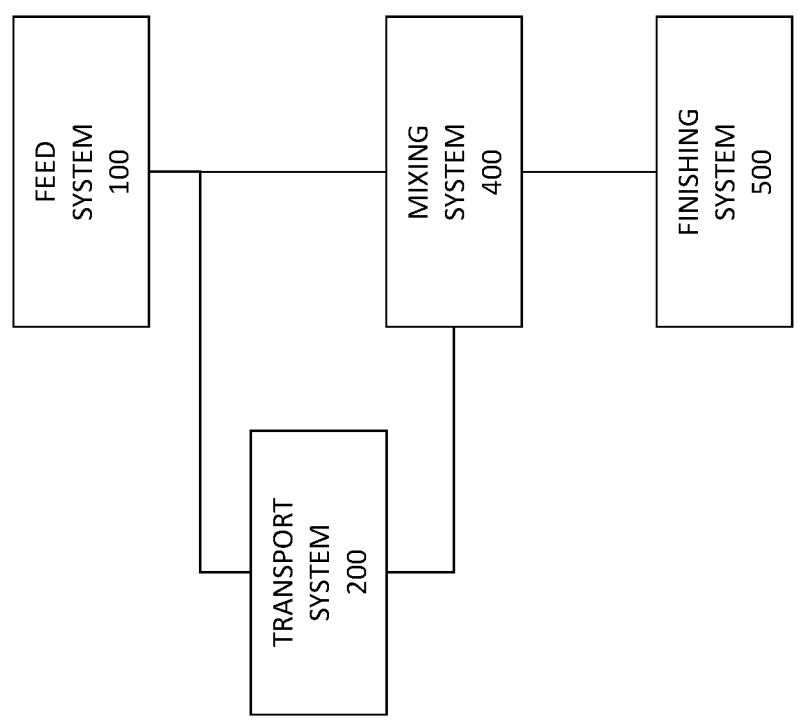
FIG. 1 is a block diagram showing a system for continuous production of a thermoplastic composition used in roadway markings according to one example of the present disclosure.

Some thermoplastic material marking products may require multiple batches to produce enough thermoplastic material for the desired marking. Other products may be cost prohibitive as excess material produced due to the minimum batch size constraints may be wasted or carried in inventory, both of which are costly. Batch processing also inherently includes batch-to-batch variability, which can impact product quality. Due to the disparate volumes of material needed for thermoplastic marking products and a desire for improved product quality, a need exists for a robust system capable of continuous production.

Provided herein are systems and methods for continuous production of thermoplastic compositions useful for roadway markings. The systems can produce thermoplastics for roadway markings in a wide range of product volumes. For example, the system may produce small volumes of one thermoplastic composition and quickly changeover to another thermoplastic composition. For some thermoplastic compositions, the system can produce thermoplastic products to order, without concern to batch size and potential waste constraints. A continuous process can minimize batchto-batch variability to improve product quality, reduce production costs, eliminate batch size constraints, and increase product offerings available. Continuous processing can provide a short heat history and lower energy consumption as compared to batch processing.

In some cases, a system for producing thermoplastic material for roadway markings may comprise a feed system and a mixing system. In some examples, the feed system may comprise a plurality of feeders, where each feeder may be configured to discharge a material to the mixing system at a feed rate according to a selected product formulation. In some examples, the mixing system may be configured to receive, heat, and combine the materials to produce a thermoplastic material, and discharge the thermoplastic material at a determined discharge rate.

In some examples, each feeder may comprise a feed hopper to supply material to the feeder. In some cases, the feed system may further comprise a bulk hopper, where the bulk hopper may be automated to maintain a determined amount of material in the feed hopper. In certain examples, the bulk hopper may be charged directly from a supersack or charge vessel. In other examples, the bulk hopper may be manually charged as needed to maintain material supply to the feed hopper and feeder. Optionally, the feed system can include an automatic valve integrated with a control system to supply material to the feeder.

In some examples, the rate of discharge of a material may be determined by a weight differential of the feeder over time. For example, the feeder may be configured to be positioned on load cells. Optionally, a control system may determine the feed rate based on a loss in weight. In other examples, the rate of discharge a material may be determined by volumetric flowrate from the feeder. In some examples, the control system can modify the feed rate based on quality parameters of the thermoplastic composite. In some examples, the control system can modify the feed rate based on the discharge rate of the thermoplastic composite from the system. In some examples, the control system can determine the feed rate based on the selected product formulation and throughput rate. In certain examples, one or more materials may be directly charged to the mixing system. These directly charged materials may be a solid or a liquid.

In some examples, the feeder may comprise a vibratory conveyer, a screw conveyer, a liquid feeder or charge line, disc feeder, auger, or other feeder known in the art to transfer the material to the mixing system. Optionally, the feeder may include a shield to reduce dust and/or contamination.

In some examples, the system may further comprise a transport system configured to receive the materials from the feed system and transport the materials to the mixing system. In certain examples, the transport system may comprise a bucket conveyer with plurality of buckets or a belt conveyer. In other examples, the transport system may comprise a pneumatic conveyer. Other transport systems known in the art may be used to transfer the material from the feed system to the mixing system. The transport system may transport the materials in a linear mode to downstream processing. Optionally, the transport system may transport materials vertically to downstream processing that may positioned above the feed system. For example, the receiving point for the mixing system may be positioned above the feed system and a transport system such as a bucket conveyer or pneumatic conveyer may transfer material vertically to the mixing system. Optionally, the transport system may be enclosed or include a shield to reduce dust and/or contamination.

The mixing system may comprise a mixer. In some examples, the mixer may be a twin-screw mixer or extruder. In other examples, the mixer may be a single screw mixer or extruder. In some examples, the mixer may comprise multiple heating zones and/or comprise differentiated mixing zones within the mixer. In certain examples, the mixer may comprise a heated vessel with an agitator. In some cases, the vessel may comprise a small working volume to rapidly heat the materials and deliver the heated material to a secondary process, such as an extrusion process. The mixer may be heated using hot oil, electrical pads or bands, steam, microwave energy, or other mediums known in the art. In some examples, the mixing system comprises a charge chute to receive materials from the feed system or transport system and charge the material to the mixer. In certain cases, the mixing system can include optional feeders to provide additional materials into directly to the mixer or charge chute of the mixer.

The mixer may combine and heat the materials to produce a thermoplastic material. In some cases, the mixer may heat the materials to at least 150° F. In some cases, the mixer may heat the materials to at least 200° F. In some cases, the mixer may heat the materials to at temperature between 150° F. and 450° F.

In some examples, the mixing system may further comprise a smoothing system. The smoothing system may be configured to receive the materials from the feed system or transport system and feed the materials to the mixer. In some examples, the smoothing system may comprise a smoothing feeder that comprises a vibratory conveyer, a screw conveyer, auger, or other feeder to feed material to the charge chute or mixer. In some examples, the smoothing system may further comprise a smoothing hopper to receive the material from the feed system or transport system and supply the material to the smoothing feeder.

In some cases, the smoothing system can reduce surges or pulses in the volume of material fed to the mixer, and produce a steady charge rate. In some examples, the smoothing system can prevent overloading the mixer. In some examples, the smoothing system can prevent starving the mixer, which could cause voids in the mixer that could damage the mixer and/or result in product defects.

The smoothing system can reduce surges or pulses in the ratio of materials fed to the mixer. In some examples, variability in the feed system may cause surges or pulses of certain materials to the mixer. This variability can result in swings to product quality and compositional make-up over period of time (e.g., a 24-hour production run on a screw mixer). The smoothing system can hold a variable volume of material from the feed system. In some cases, the smoothing system may hold and mix at least a portion of the materials from the feed system to increase uniformity of the material ratio fed to the mixer over time. In certain examples, the smoothing system may comprise an agitator to blend the materials prior to discharging the materials to the mixer. In some examples, the smoothing system can improve product quality, and especially reduce variation from batch processing by blending the materials in the smoothing system prior to transfer to the mixer.

In some cases, the mixer may discharge the thermoplastic material to various processes. In some examples, the mixer may further comprise a die configured to conform the discharged thermoplastic material to a target shape or form. In some examples, the mixer may discharge the thermoplastic material as an unformed molten thermoplastic material to a finishing system. In some examples, the finishing system may comprise an accumulator, a surface treatment system, a cutting system, a product cooling system, or combination thereof. The finishing system may comprise a conveyer belt to transport the thermoplastic material. The accumulator may be positioned on the conveyer belt and receive the molten thermoplastic material. In some examples, the thickness of the thermoplastic material may be determined by a combination of the height of the accumulator from the belt and the speed of the belt. Optionally, the surface treatment system may apply reflective materials, such as glass beads. The beads may be dropped on the surface according to meet a depth requirement, coverage requirement, or mechanical strength requirement (e.g., abrasion). Optionally, the surface treatment system may apply abrasive frictional materials, such as corundum, quartz, sand, or glass. Optionally, the surface treatment system may imprint or notch the surface of the thermoplastic material. In some examples, the cutting system may trim the edge of the thermoplastic material to a uniform width. In some examples, the cutting system may cut the thermoplastic material into sheets. In some examples, the product cooling system may apply water to thermoplastic material to reduce the temperature of the material. In certain examples, the product cooling system may include air jets to blow excess water and further cool the material.

In some cases, the system may perform online measurements of color, bead depth, bead deposit pattern, product thickness, product shape, product length, product width, product temperature, levelness, and voids using laser measurement, optical cameras, infrared cameras, among other technologies known in the art.

Turning to the figures, FIG. 1 shows a system for continuous production of a thermoplastic composition used in roadway markings according to one example of the present disclosure. A feed system 100 feeds materials for the thermoplastic composition to a mixing system 400. Optionally, a transport system 200 may transport materials from the feed system 100 to the mixing system 400. The mixer 440 may discharge to a finishing system 500.

Figure 2:
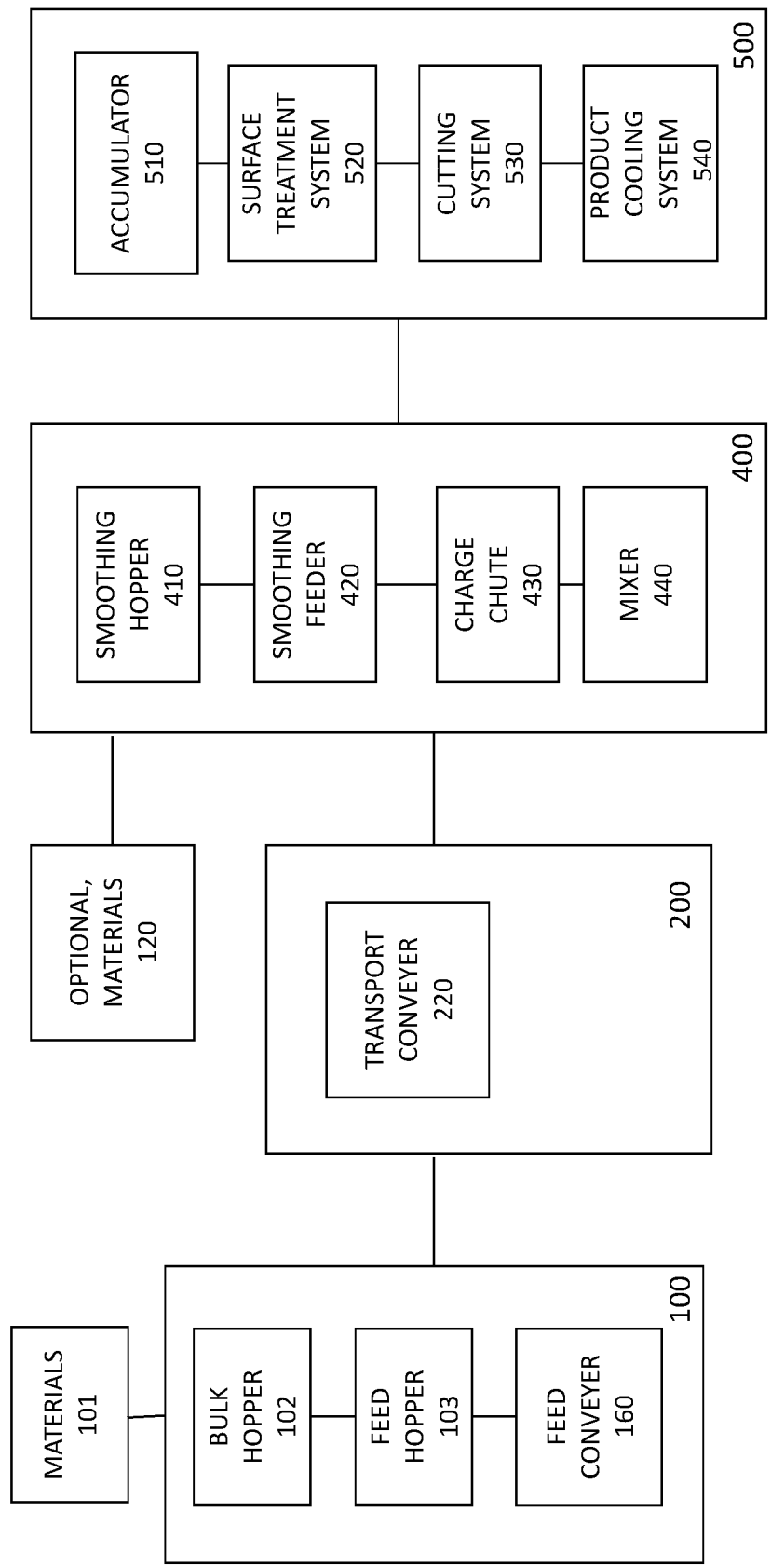
FIG. 2 is a block diagram showing a system for continuous production of a thermoplastic composition used in roadway markings according to one example of the present disclosure.
Figure 3:
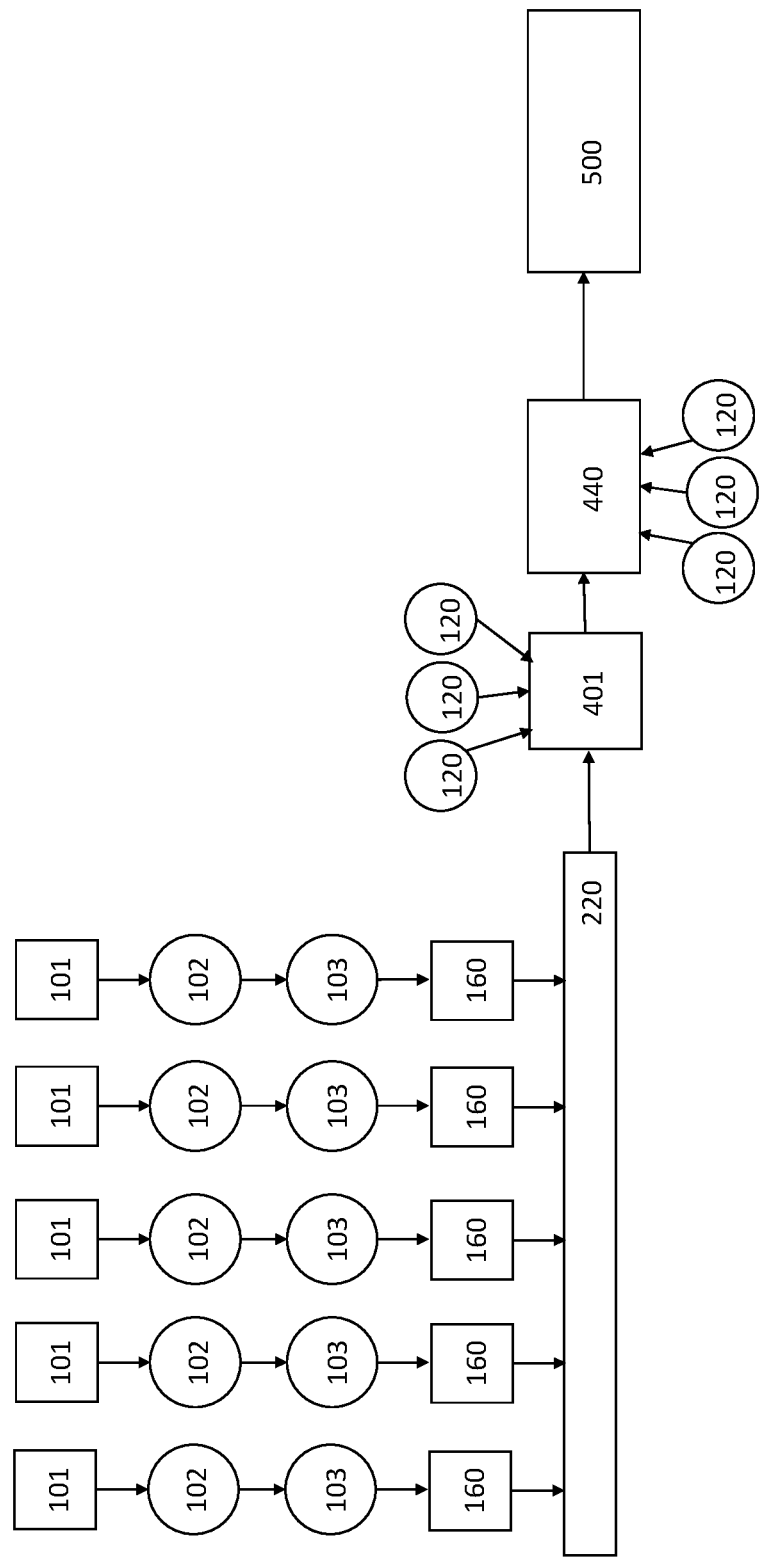
FIG. 3 is a diagram showing a system for continuous production of a thermoplastic composition used in roadway markings according to one example of the present disclosure.

FIGS. 2 and 3 show a system for continuous production of a thermoplastic composition used in roadway markings according to one or more examples of the present disclosure. The materials 101 can be discharged to a feed system 100. In some embodiments like that shown in FIG. 2, the feed system 100 can include a bulk hopper 102, feed hopper 103, and feed conveyor 160. The materials 101 can be transported by a transport system 200 to a mixing system 400 to produce a thermoplastic material. In some embodiments like that shown in FIG. 2, the transport system can include a transport conveyer 220 and the mixing system 400 can include a smoothing hopper 410, a smoothing feeder 420, a charge chute 430, and a mixer 440. The thermoplastic material can be discharged to a finishing system 500. In some embodiments like that shown in FIG. 2, the finishing system 500 can include an accumulator 510, a surface treatment system 520, a cutting system 530, and a product cooling system 540.

As shown in FIG. 3, one or more materials 101, which in some examples may be provided in one or more supersacks or other bulk packaging may be directly charged to a bulk hopper 102. The bulk hopper 102 may comprise a control valve (not shown) to maintain supply of material to the feed hopper 103. The feed hopper 103 may comprise load cells or in the alternative, the feed hopper 103 may comprise a volumetric meter. Materials may be transferred from the feed hopper 103 to a transport conveyer 220 by feed conveyer 160 for transport to the mixing system 400. The transport conveyer 220 transfers material to the smoothing system 401. The smoothing hopper 410 supplies material to the smoothing feeder 420. The smoothing hopper 410 may comprise load cells. The smoothing feeder 420 provides a steady flow of material to the mixer 440 using a charge chute or bin 430. Optionally, some materials 120 may be directly charged to the mixer 440 or charge chute 430. Optionally, some materials 120 may be directly charged to the smoothing hopper 410. In some cases, the mixer 440 may discharge to a finishing system 500, including an accumulator 510, a surface treatment system 520, a cutting system 530, a product cooling system 540, or combinations thereof.

Figure 4:
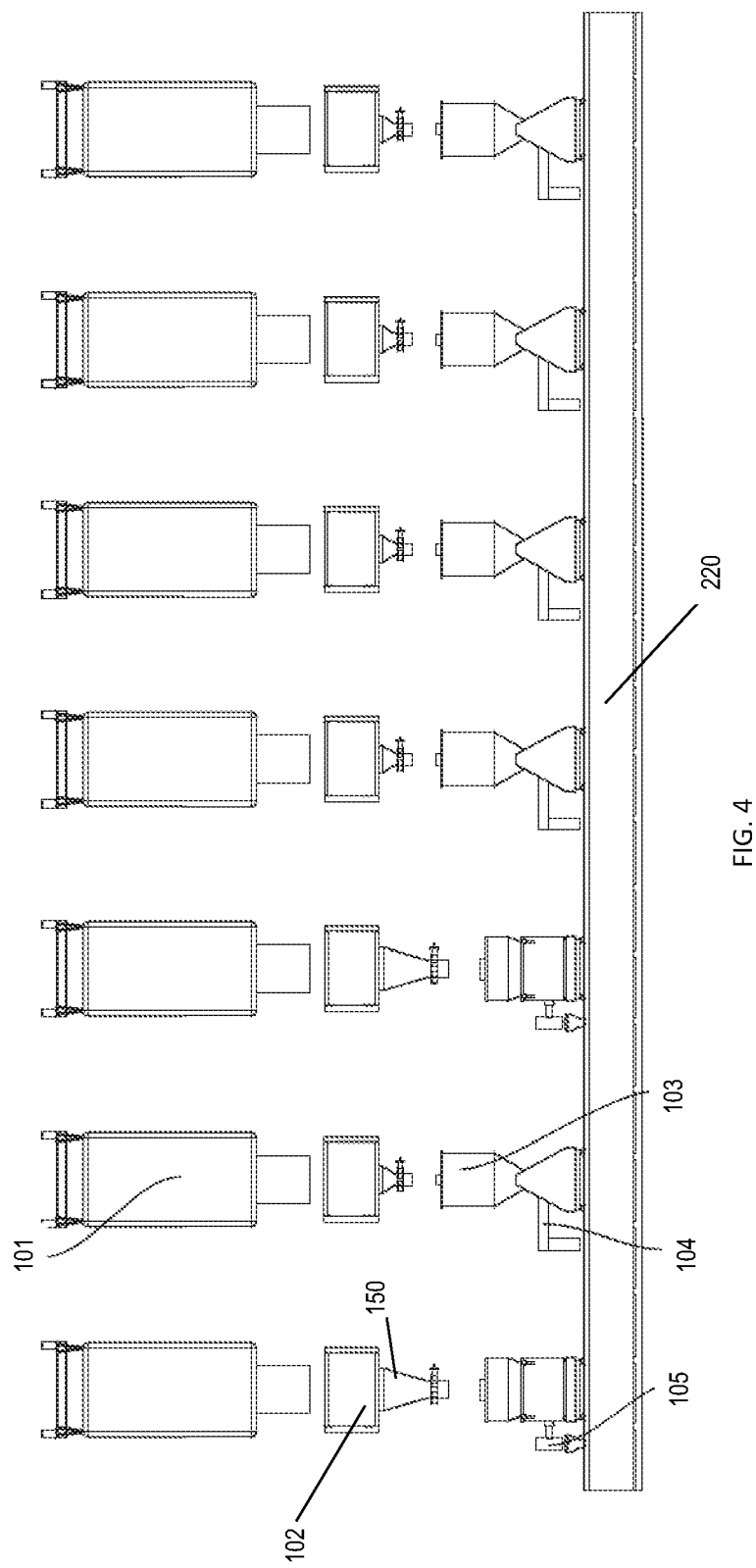
FIG. 4 is a side view illustrative schematic of portions of an exemplary continuous process thermoplastic composition used in roadway markings according to one or more examples described herein.

FIG. 4 is an illustrative schematic of continuous process thermoplastic composition used in roadway markings according to one or more examples described herein. One or more materials 101 may be provided in supersack or other bulk packaging. The materials 101 may be directly charged to a bulk hopper 102. The bulk hopper 102 may comprise a control valve 150 to maintain supply of material to the feed hopper 103. The feed hopper 103 may comprise load cells or in the alternative, the feed hopper 103 may comprise a volumetric meter. Materials may be transferred from the feed hopper 103 to a transport conveyer 220 by a screw conveyer 105. Materials may be transferred from the feed hopper 103 to a transport conveyer 220 by a vibratory conveyer 104. While seven feed hoppers may be shown, any number of feed hoppers can be used.

Figure 5:
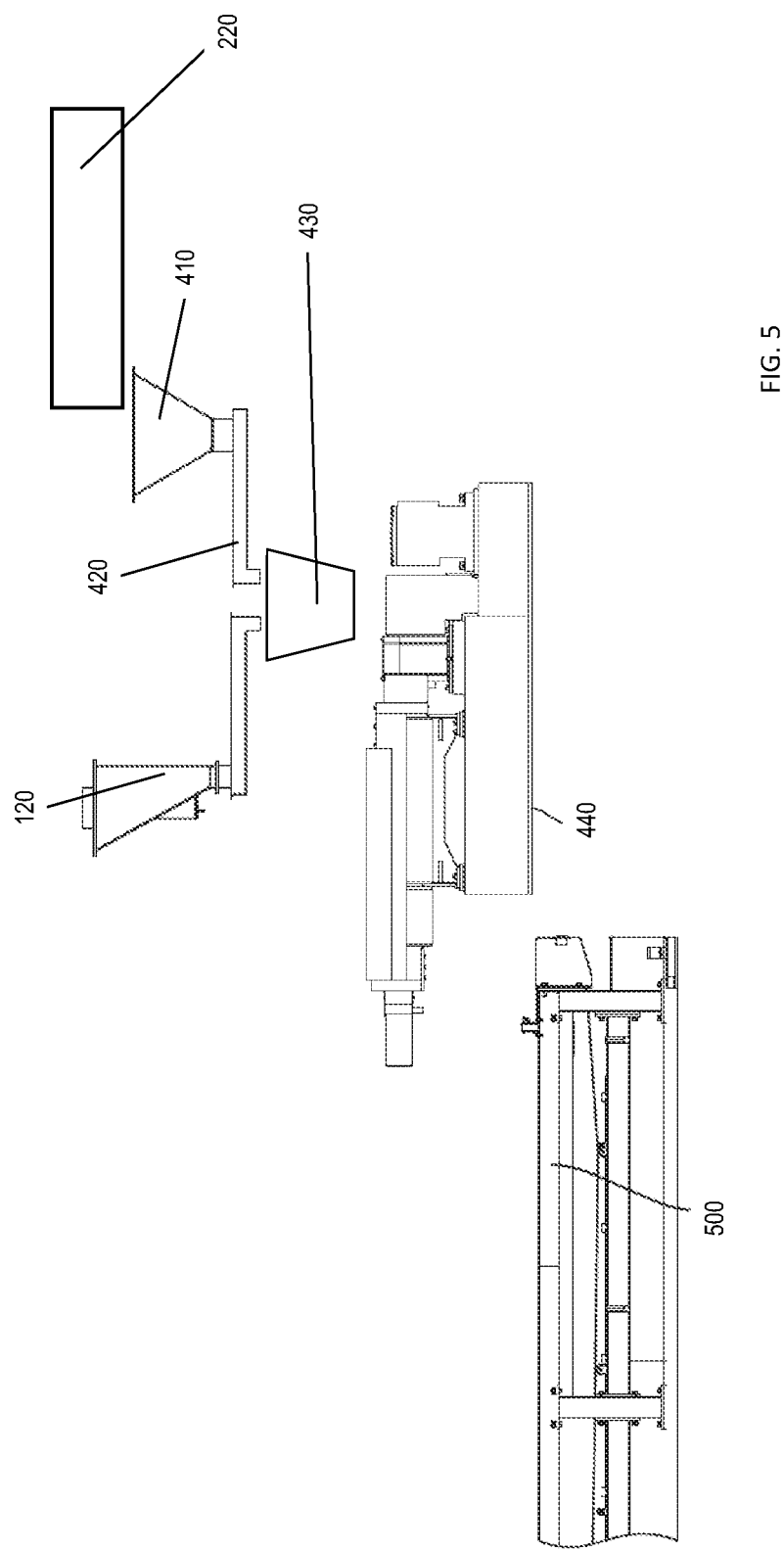
FIG. 5 is a side view illustrative schematic of portions of an exemplary continuous process thermoplastic composition used in roadway markings according to one or more examples described herein.

As shown in FIG. 5, the transport conveyer 220 transfers the materials 101 to the smoothing hopper 410. In the smoothing system 401, materials 101 may be blended to reduce product variability and provide steady feed to the mixer 440. The blended materials are transferred to the mixer 440 by the smoothing feeder 420 through the charge chute 430. The smoothing feeder 420 may include a vibratory tray, an auger, or screw. The mixer 440 discharges to a finishing system 500.

In some cases, the transport conveyer 220 may comprise buckets that convey the materials upstream of the continuous process. In some cases, the transport conveyer 220 may comprise a vertical section that transfers material above the mixer 440.

Figure 6:
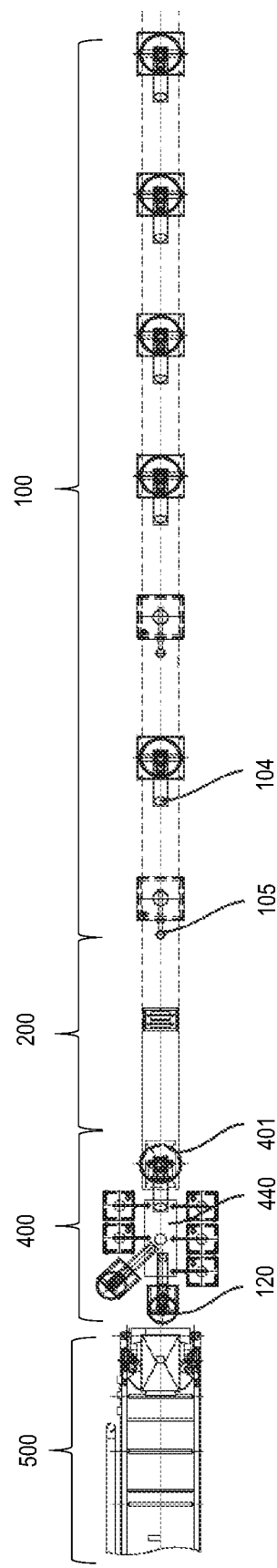
FIG. 6 is a top view illustrative schematic of portions of an exemplary continuous process thermoplastic composition used in roadway markings according to one or more examples described herein.

FIG. 6 is a top view illustrative schematic of continuous process thermoplastic composition used in roadway markings according to one or more examples described herein. The feed system comprises vibratory trays 104 and screw feeder 105 to transfer the material from the feed system 100 to the transport system 200. The transport system 200 discharges the material in the mixing system 400. The smoothing system 401 feeds the mixer 440. Optionally, material 120 may be directly charged to the mixer 440. The mixing system 400 may discharge to a finishing system 500.

Figure 7:
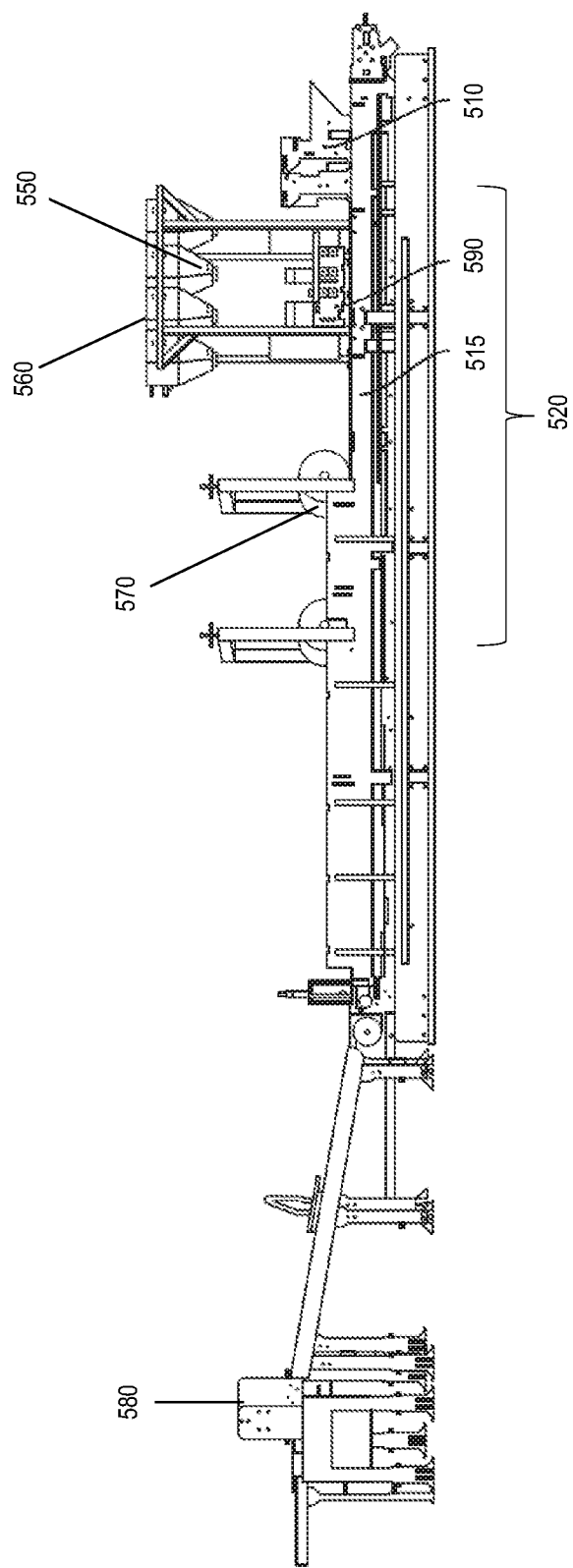
FIG. 7 is a side view illustrative schematic of portions of an exemplary finishing system used in roadway markings according to one or more examples described herein.

FIG. 7 is a side view illustrative schematic of a finishing process used in roadway markings according to one or more examples described herein. In some examples, the finishing system 500 comprises an extrusion process. The extruder comprises an accumulator 510 and discharges the extruded product onto a belt 515. In some cases, the belt 515 may be heated or cooled. The thermoplastic product may be transferred downstream to a surface treatment system 520. While FIG. 7 shows a surface treatment system 520 as including 560, 550, 570, and 590, one or more of these can be used, for example, a surface treatment system 520, may only include a bead dropper 560, or may only include an abrasive dropper 550, or combinations thereof. The inclusion of particular surface treatment system 520 components may be based on the desired properties of the thermoplastic product. The surface treatment system 520 may include a bead dropper 560, where glass beads are topically applied. In some examples, the surface treatment system 520 may include directional elements 590 to direct the beads from the bead dropper 560 to the thermoplastic product in a particular pattern or arrangement. The surface treatment system 520 may include an abrasive dropper 550, where an abrasive material may be topically applied. The surface treatment system 520 may include a notching, imprinting, or cutting station 570. The thermoplastic product may be transferred downstream to a cutting system 580. The product may be cut according to specifications and stacked for transport.

Figure 8:
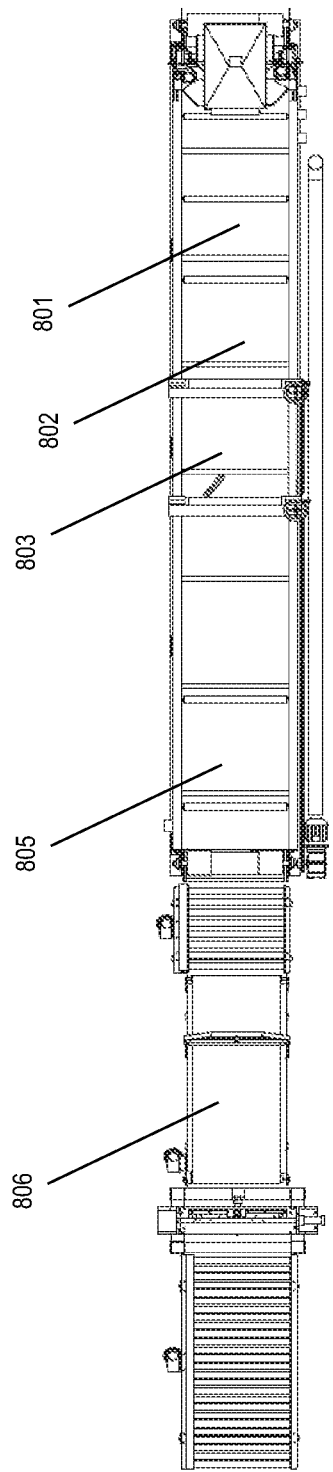
FIG. 8 is a top view illustrative schematic of portions of an exemplary finishing system used in roadway markings according to one or more examples described herein.

In some examples, the system may further comprise a control system configured to monitor and adjust the feed rate of the feeders based on the discharge rate from the mixing system and the selected product formulation. The control system may integrate the components of the feed system with the mixing system to maintain the compositional ratio of the product formulation of the thermoplastic material and temperature ranges of the mixing system. In some examples, the finishing system 500 may comprise one or more measurement or control devices or sensors. FIG. 8 is a top view illustrative schematic of a finishing system according to one or more examples described herein. As shown in FIG. 8, the system may include sensors or devices for color 801, bead depth 802, bead deposit pattern 803, product thickness 804, product dimension 805, or product temperature 806. While FIG. 8 shows sensors or devices 801-806, one or more of these can be used. The inclusion of particular sensors or devices may be based on the desired properties of the thermoplastic product. In some examples, other parameters may be monitored or analyzed in the system. While FIG. 8 shows sensors or devices 801-806 located within a zone of the system, the sensor or devices may located in other zones of the system.

In certain examples, the control system may adjust feed rate of specific components based on the sensor or control device. In certain examples, the control system may adjust discharge rate from the mixer based on the sensor or control device. For example, the feed rate of a pigment may be adjusted based on a product color result to increase or decrease the pigment as needed to meet the target range for the product. For example, the settings of the bead dropper 560 may be adjusted based on a bead depth result from the bead depth sensor 802 to meet the target range for the product.

In some cases, the system described herein can improve product quality over a batch process. For example, a continuous process can minimize batch-to-batch variability to improve product quality. As another example, a continuous can increase product offerings available as there are no reactor or kettle size restraints. The volume of product in a continuous system a given time may be significantly less than a conventional batch process. The reduced volume may be heated and mixed in significantly less time that the larger volume in a kettle of a batch process. The reduced heat time may have beneficial results on product quality, especially product color. For light-colored (e.g., white) products, the risk of oxidation or thermal degradation may be substantially eliminated in a continuous system. Not only may products be more uniform in quality, a continuous system may provide for new product offering that would previously not be possible.

Figure 9:
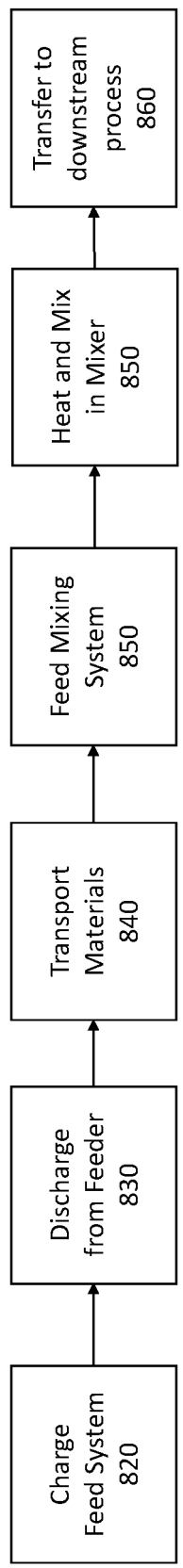
FIG. 9 is a block diagram showing a method for continuous production of a thermoplastic composition according to one or more examples described herein.

Also described herein are methods of making the thermoplastic composition for roadway markings. FIG. 9 shows a diagram of a method described herein according to one example. A feed system may be charged 820 and discharged from a feeder 830. The materials may be transported 840 and fed to the mixer 850. Once transferred to the mixer, the materials may be heated and mixed 850. Optionally, the product may be transferred to a downstream process 860 for further processing or finishing.

In some examples, a method for producing thermoplastic composition for roadway markings can comprise charging a feed system comprising a plurality of feeders with components of the thermoplastic composition, discharging the components from the feeders at a determined feed rate, feeding the components to a mixing system, mixing and heating the components in the mixing system, and discharging the thermoplastic composition. In some examples, the method may further comprise adjusting the feed rate of the components based on the discharge rate of the thermoplastic composition.

In certain examples, the method may further comprise transporting the components from the feed system to the mixing system by a transport system. The transport system may comprise one or more of a pneumatic conveyer, belt conveyer, or bucket conveyer. In some cases, the mixing system may comprise a smoothing system and a mixer. In certain examples, the components may be transported from the feed system or transport system to the smoothing system. In certain examples, the method may further comprise blending at least a portion of the components in the smoothing system prior and feeding the blended components to the mixer. Blending the components may increase uniformity of the composition over the course of a production run. In some cases, the thermoplastic material may be discharged to a finishing system.

In some examples, the discharge rate of the components may be controlled by change in weight of the hopper. In some examples, the discharge rate of the components may be controlled by change in a volumetric flowrate of one or more components. In some examples, the discharge rate of components may be controlled based on downstream quality parameters. For example, the method may comprise performing inline quality analysis in the finishing system and adjusting discharge rate of at least one component according to an inline quality analysis result.

In some cases, the mixer may be heated to a temperature of between 200° F. and 800° F. In some cases, the mixer may combine the components in less than 10 minutes. In some cases, the mixer may combine the components in less than 5 minutes. In some cases, the product temperature exiting the mixer may be 150° F. to 450° F.

In some examples, the components of the thermoplastic may comprise one or more resins, an antioxidant, one or more copolymers, one or more pigments, sand, calcium carbonate, glass beads, and other additives.

In some examples, a thermoplastic composition may comprise a copolymer, an inorganic filler, a hard resin, and glass beads. In some examples, the composition may further comprise titanium dioxide, at least one pigment, an antioxidant, or other additive.

In some examples, a thermoplastic composition may comprise a copolymer, at least one of a rosin-modified ester or a modified gum rosin, a pigment, a wax, an antioxidant, a light stabilizer, a plasticizer, and an inorganic filler. For example, each of the component materials may be included in a separate feeder (see, e.g., FIG. 4, where the addition of each component can be introduced to the feed system via a separate supersack, hopper, feed hopper, and control valve set up). In some examples, one or more of these component materials may be introduced in the mixing system with other materials 120.

In some examples, a thermoplastic composition may comprise at least one copolymer, at least one of a rosin-modified ester or a modified gum rosin, a pigment, and at least one inorganic filler. The composition may further comprise at least one of an antioxidant, a light stabilizer, or titanium dioxide.

In some embodiments, the thermoplastic composition comprises at least 3 weight percent polypropylene/polyethylene copolymer, at least 18 weight percent binder, at least 20 percent intermix of inorganic filler, and at least one of the following: at least 1 weight percent of a polyethylene homopolymer wax, at least 1 weight percent alkyd resin and soybean oil mixtures, at least 0.5 weight percent of a UV stabilizing compound, at least 1 weight percent of an alkyd resin modified glyceryl phthalate, at least 1 weight percent of a polyurethane.

In some embodiments, the thermoplastic composition comprises 4-11% copolymer, 4-14% hard resin, 50-90% inorganic filler, 1-10% titanium dioxide, 0-1% antioxidant, 2-10% pigment, and up to 2% other additives.

In some embodiments, the thermoplastic composition described herein comprises 3 to 10 wt. % polyamide resin, 0.7 to 3 wt. % copolymer, 5 to 20 wt. % rosin-modified ester, 0.2 to 1.5 wt. % pigment, up to 5 wt. % wax, up to 0.5 wt. % antioxidant, up to 0.7 wt. % light stabilizer, up to 4 wt. % plasticizer, and 20 to 80 wt. % inorganic filler. In some embodiments, the thermoplastic composition comprises 100% solid materials.

In some embodiments, the thermoplastic composition described herein comprises at least one copolymer in an amount up to 12% (e.g., from 0 to 5%, 0.2 to 2.5%, or from 1 to 6%). In some examples, the thermoplastic composition may include about 0.1%, 0.2%, 0.4%, 0.6%, 0.8%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%. 11%. 11.5%, or 12% copolymer. All are expressed in wt. %. In certain embodiments, the composition may be substantially free of a copolymer. In some embodiments, the copolymer comprises at least one of ethylene vinyl acetate and ethylene maleic anhydride. In some examples, the copolymer comprises a polypropylene/polyethylene copolymer.

In some examples, the thermoplastic composition described herein comprises a hard resin in an amount of from about 2 to about 30% (e.g., from 2 to 20%, from 5 to 25%, or from 10 to 20%). In some examples, the thermoplastic composition may include about 2%, 3%, 4%, 5%, 6%, 7%, 8%, 9%, 10%, 12%, 14%, 16%, 18%, 20%, 22%, 24%, 26%, 28%, or 30% polyamide resin. All are expressed in wt. %. In some embodiments, the hard resin may be a polyamide resin. In some embodiments, the resin comprises at least one of polyolefin elastomers, polypropylene copolymers, styrene-butadiene-styrene (SBS) polymers, styrene-isoprene-styrene (SIS) polymers. The resin may provide toughness, flexibility, and bond strength to the composition, while binding together all the components of thermoplastic composition.

In some embodiments, the thermoplastic composition described herein comprises an inorganic filler in an amount of from about 5 to about 90 wt. % (e.g., from 10 to 50%, from 20 to 50%, or from 40 to 60%). In some examples, the thermoplastic composition may include about 5%, 10%, 20%, 25%, 30%, 35%, 40%, 45%, 50%, 55%, 60%, 65%, 70%, 75%, 80%, 85%, or 90% inorganic filler. All are expressed in wt. %. In some embodiments, the inorganic filler comprises one or more of calcium carbonate, silica, quartzite, marble grit, glass powder, glass cullet, and alumina. In some examples, the inorganic filler may be a binder. The inorganic filler may add bulk to the composition and provide a composition that has greater elongation properties.

In some examples, the thermoplastic composition described herein comprises glass beads in an amount of from about 2% to about 50% (e.g., from 10 to 30%, from 30 to 40%, or from 35 to 50%). In some examples, the thermoplastic composition may include about 2%, 3%, 4%, 5%, 6%, 7%, 8%, 9%, 10%, 12%, 14%, 16%, 18%, 20%, 22%, 24%, 26%, 28%, 30%, 32%, 34%, 36%, 38%, 40%, 42%, 44%, 46%, 48%, or 50% glass beads. All are expressed in wt. %. In some embodiments, the glass beads may be an intermix of glass beads. In some embodiments, the glass beads comprise at least one of AASHTO Type I, Type II, Type III, or Type IV glass beads.

In some embodiments, the thermoplastic composition described herein comprises a rosin-modified ester in an amount up to about 40 wt. % (e.g., from 5 to 15%, from 3 to 18%, or 11 to 25%). In some examples, the thermoplastic composition may include about 1%, 2%, 3%, 4%, 5%, 6%, 7%, 8%, 9%, 10%, 12%, 14%, 16%, 18%, 20%, 22%, 24%, 26%, 28%, 30%, 32%, 34%, 36%, 38% or 40% rosin-modified ester. All are expressed in wt. %. In certain embodiments, the composition may be substantially free of rosin-modified esters. In some embodiments, modified rosin ester comprises tall oil esters, maleic rosin ester, pentaerythritol rosin ester, glycerol rosin ester, disproportionated rosin ester, hydrogenated rosin, and polymerized rosin.

In some embodiments, the thermoplastic composition described herein comprises a modified gum rosin in an amount up to about 40 wt. % (e.g., from 5 to 25%, from 2 to 15%, or 11 to 25%). In some examples, the thermoplastic composition may include about 1%, 2%, 3%, 4%, 5%, 6%, 7%, 8%, 9%, 10%, 12%, 14%, 16%, 18%, 20%, 22%, 24%, 26%, 28%, 30%, 32%, 34%, 36%, 38% or 40% modified gum rosin. All are expressed in wt. %. In certain embodiments, the composition may be substantially free of modified gum rosins. In some embodiments, modified gum rosin comprises modified gum rosin comprises glyceryl hydrogenated rosin, rosin modified phenolic resin, pentaerythrityl rosin, glyceryl rosin, disproportionated rosin, polymerized rosin and hydrogenated rosin.

In some embodiments, the thermoplastic composition described herein comprises one or more pigments in an amount of from about 0.1 to about 10 wt. % (e.g., from 0.2 to 1.2%, 0.5 to 2%, or 2 to 5%). In some examples, the thermoplastic composition may include about 0.1%, 0.2%, 0.3%, 0.4%, 0.5%, 0.6%, 0.7%, 0.8%, 0.9%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10% pigment. All are expressed in wt. %. In some embodiments, the pigment may comprise carbon black or titanium dioxide. The pigment may provide color and opacity to the composition. In some examples, the composition may comprise more than one pigment.

In some embodiments, the thermoplastic composition described herein comprises wax in an amount of about up to 20 wt. % (e.g., from 0.5 to 5%, from 1 to 8%, or 5 to 10%). In some examples, the thermoplastic composition may include about 0.5%, 1%, 2%, 3%, 4%, 5%, 6%, 7%, 8%, 9%, 10%, 12%, 14%, 16%, 18%, or 20% wax. All are expressed in wt. %. In some embodiments, the wax may comprise polyethylene wax, functionalized PE wax, polypropylene wax and similar formulations.

In some embodiments, the thermoplastic composition described herein comprises an antioxidant in an amount of about up to 3 wt. % (e.g., from 0.1 to 0.4%, from 0.8 to 2%, or 0 to 3%). In some examples, the thermoplastic composition may include about 0.05%, 0.1%, 0.15%, 0.2%, 0.4%, 0.6%, 0.8%, 1%, 1.2%, 1.4%, 1.6%, 1.8%, 2%, 2.2%, 2.4%, 2.5%, 2.6%, 2.7%, 2.8%, 2.9%, or 3% antioxidant. All are expressed in wt. %. In certain embodiments, the composition may be substantially free of an antioxidant.

In some embodiments, the thermoplastic composition described herein comprises a light stabilizer in an amount of about up to 3.5 wt. % (e.g., from 0.2 to 1.6%, from 0.6 to 2.5%, or 0 to 3%). In some examples, the thermoplastic composition may include about 0.05%, 0.1%, 0.2%, 0.4%, 0.6%, 0.8%, 1%, 1.2%, 1.4%, 1.6%, 1.8%, 2%, 2.2%, 2.4%, 2.6%, 2.8%, 3%, 3.2%, 3.4%, or 3.5% light stabilizer. All are expressed in wt. %. In certain embodiments, the composition may be substantially free of a light stabilizer. In some embodiments, the light stabilizer comprises a hindered amine, or hindered amine light stabilizer (HALS).

In some embodiments, the thermoplastic composition described herein comprises a plasticizer in an amount of about up to 10 wt. % (e.g., from 1 to 4%, from 1 to 5%, or from 3 to 7%). In some examples, the thermoplastic composition may include about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10% plasticizer. All are expressed in wt. %. In some embodiments, the plasticizer comprises one or more of castor oils, other naturally-occurring oils, di-isononyl phthalate, or other phthalates plasticizers. The plasticizer may provide toughness, flexibility, and bond strength to the composition, while binding together all the components of thermoplastic composition.

In some examples, the composition may further comprise additives, for example at least one of a rheology modifier, a wetting and spreading agent, a leveling agent, a conductivity additive, an adhesion promoter, an anti-blocking agent, an anti-cratering agent and anti-crawling agent, an anti-freezing agent, a corrosion inhibitor, an anti-static agent, a flame retardant and intumescent additive, a dye, an optical brightener and fluorescent additive, a UV absorber and light stabilizer, a chelating agent, a cleanability additive, a cross-linking agent, a flatting agent, a flocculant, a humectant, an insecticide, a lubricant, an odorant, an oil, a wax and slip aid, a soil repellant, a stain resisting agent, and or combinations thereof.

The method described herein may further comprise a feedback control loop. In some cases, inline quality analysis measurements of the finishing system provide feedback to the mixer and feed systems to control adjust process parameters such as temperature and feed rate to maintain product properties. For example, the discharge rate of at least one component may be adjusted according to the inline quality analysis result in addition to or in the alternative adjusting the condition of the mixer. In one example, the feed rate of pigment may be adjusted to adjust product color specification. In other examples, the temperature of one or more zones of the mixer may be increased or decreased to adjust bead depth. In other examples, the mixing time or rpm may be adjusted. In some cases, the system may perform online measurements of color, bead depth, bead deposit pattern, product thickness, product shape, product length, product width, product temperature, levelness, and voids using laser measurement, optical cameras, infrared cameras, among other technologies known in the art.

In some embodiments using the methods and compositions described herein, the systems and methods can provide advantages as compared to conventional batch processes used to make thermoplastic compositions.

A conventional batch process for thermoplastic products useful in roadway markings includes charging a reaction vessel or kettle with 3000-5000 pounds of material, heating the materials, and mixing the materials to form the thermoplastic mixture, holding the batch pending preliminary quality assurance testing, and post-processing of the batch through an extruder or other product formation step. A conventional batch process may require at least four hours to charge, heat, and mix the product to be ready for extrusion. In some cases, the batch process may be up to six hours from charge until ready for finished processing or extrusion.

The length of time the product is exposed to high temperature to heat and mix the kettle can adversely impact product quality. An extended heat history runs the risk of charring product, may require antioxidants or other additives such as brighteners to achieve the desired formulation and product specifications. The disadvantages of a batch process include limited batch size and changeover time when making a range of products. Common products may run in a campaign manner without cleaning the kettle. The residue remaining from prior batches can adversely impact product quality, especially color, because of the extended heat history of the residue, which may be mixed into subsequent batches. When disparate products are produced, the kettle may require a cleanout or changeover procedure to remove residue that may contaminate a subsequent product run in the kettle. A kettle changeover process may take two to four hours to complete, which is costly downtime for the process.

In some embodiments of the systems and methods described herein, a continuous process can improve product quality and throughout compared to a conventional batch process. For example, a continuous process can produce thermoplastic product in less than 10 minutes from initial charge to the feed system. The volume of material to heat and mix at a given time may be orders of magnitude lower than a conventional process. In some cases, a continuous process may produce product in less than 9 minutes (8 minutes, 7 minutes, 6 minutes, or 5 minutes). In some cases, larger product runs may be performed than conventional batch processes because a continuous process has no limitation from kettle size. In other cases, previously unavailable small product runs are possible without minimum batch size requirements and quick changeover of a continuous process. In some cases, the continuous process can changeover in less than 3 minutes or 2 minutes. The improved changeover not only reduces downtime of the process, but also reduces process waste.

The limited heat history of a continuous product can allow for colors previously unavailable for lack of thermal stability. In some cases, additives for optical brightening or oxidation may be omitted from product formulations. Online measurements can allow quality assurance to be completed in less than 10 minutes and prevent quarantining of in-process materials. In the event off-spec material is produced, the reduced heat history can permit rework of the material that may be relegated to waste in a batch process into first quality thermoplastic material meeting all specifications.

Some advantages of embodiments of the system described herein include a reduction in processing time, cost savings, and/or quality improvements. For example, a continuous process can provide for a 2 minute heat and mix time versus a 180 minute heat and mix time for a conventional batch process. The reduction in heat history can improve product quality. Other advantages of embodiments of the system include reduced startup and changeover time. For example, a continuous process can provide for a 50 percent reduction in startup time (e.g., 60 minutes versus 30 minutes). For example, a continuous process can provide for a 50 percent reduction in startup time (e.g., 60 minutes versus 30 minutes) and a continuous process can provide for a 5 minute color changeover versus a 180 minute changeover for a conventional batch process. The reduction in changeover time can reduce cost and increase production capacity. Additionally, material loss may be minimal with continuous systems versus the line loss and vessel coating that remains and is wasted after a conventional batch process. Production volumes may be customized with a continuous system, with a production run scheduled as needed to meet the target volume. A conventional batch process is limited to vessel volume. For example, batch size may be a minimum of 2200 pounds or a maximum volume of 4400 pounds. Product quality can be adjusted in real-time for a continuous system. For example, bead drop-on consistency can be monitored and adjusted by the system using loss-in-weight bead spreaders.

EXAMPLES

Example 1

Thermoplastic marking products were run on a continuous system and measured for softening point and color using delta E CMC. Table 1 shows the results from a continuous system.

TABLE 1

| Run | Softening point (° C.) | ΔE (cmc) |
| --- | --- | --- |
| 1 | 116.4 | 0.63 |
| 2 | 116.9 | 0.84 |
| 3 | 113.9 | 0.88 |
| 4 | 115 | 0.58 |
| 5 | 117.3 | 0.82 |
| Average | 115.9 | 0.75 |
| Variance | 2.005 | 0.018 |

Example 2

The same thermoplastic marking products of Example 1 were produced using on a conventional batch process and measured for softening point and color using delta E CMC. The analysis methods were the same as Example 1. Table 2 shows the results from the comparative batch process.

TABLE 2

| Batch | Softening point (° C.) | ΔE (cmc) |
| --- | --- | --- |
| A | 118.5 | 1.64 |
| B | 114.8 | 1.54 |
| C | 117.6 | 1.69 |
| D | 116 | 0.82 |
| E | 120.3 | 1.65 |
| Average | 117.44 | 1.468 |
| Variance | 4.593 | 0.134 |

Illustrative Embodiments of Suitable Systems and Methods

As used below, any reference to methods, products, or systems is understood as a reference to each of those methods, products, or systems disjunctively (e.g., "Illustrative embodiment 1-4 is understood as illustrative embodiment 1, 2, 3, or 4.").

Illustrative embodiment 1 is a system for producing thermoplastic material for roadway markings, the system comprising a feed system comprising a plurality of feeders, each feeder configured to discharge a material at a feed rate according to a selected product formulation, and a mixing system configured to receive, heat, and combine the materials to produce a thermoplastic material, and discharge the thermoplastic material at a determined discharge rate.

Illustrative embodiment 2 is the system of any preceding or subsequent illustrative embodiment, wherein each feeder comprises a vibratory conveyer, a screw conveyer, or a liquid charge line.

Illustrative embodiment 3 is the system of any preceding or subsequent illustrative embodiment, wherein the feed rate of at least one material is controlled by a weight differential of the feeder over time.

Illustrative embodiment 4 is the system of any preceding or subsequent illustrative embodiment, wherein the feed rate of at least one material is controlled by a volumetric flowrate from the feeder.

Illustrative embodiment 5 is the system of any preceding or subsequent illustrative embodiment, further comprising a transport system configured to receive the materials from the feed system and transport the materials to the mixing system.

Illustrative embodiment 6 is the system of any preceding or subsequent illustrative embodiment, wherein the transport system comprises a plurality of buckets or a belt conveyer.

Illustrative embodiment 7 is the system of any preceding or subsequent illustrative embodiment, wherein the transport system comprises a pneumatic conveyer.

Illustrative embodiment 8 is the system of any preceding or subsequent illustrative embodiment, wherein the mixing system comprises a mixer and a smoothing system, wherein the smoothing system is configured to receive the materials from the feed system or transport system and feed the materials to the mixer.

Illustrative embodiment 9 is the system of any preceding or subsequent illustrative embodiment, wherein the smoothing system comprises a vibratory conveyer or screw conveyer.

Illustrative embodiment 10 is the system of any preceding or subsequent illustrative embodiment, wherein the smoothing system comprises an agitator to blend the materials prior to feeding the materials to the mixer.

Illustrative embodiment 11 is the system of any preceding or subsequent illustrative embodiment, wherein the mixer comprises a single screw mixer or a twin screw mixer.

Illustrative embodiment 12 is the system of any preceding or subsequent illustrative embodiment, wherein the mixer comprises more than one heating zone.

Illustrative embodiment 13 is the system of any preceding or subsequent illustrative embodiment, further comprising a die configured to conform the discharged thermoplastic material to a target shape or form.

Illustrative embodiment 14 is the system of any preceding or subsequent illustrative embodiment, wherein the mixing system heats the materials to a temperature of at least 200° F.

Illustrative embodiment 15 is the system of any preceding or subsequent illustrative embodiment, wherein the mixing system heats the materials to a temperature of 150° F. to 450° F.

Illustrative embodiment 16 is the system of any preceding or subsequent illustrative embodiment, further comprising a finishing system configured to receive the discharged thermoplastic material from the mixing system.

Illustrative embodiment 17 is the system of any preceding or subsequent illustrative embodiment, wherein the finishing system comprises one or more of an accumulator, a surface treatment system, a cutting system, a product cooling system.

Illustrative embodiment 18 is the system of any preceding illustrative embodiment, further comprising a control system configured to monitor process performance, product quality parameters, or combinations thereof, and adjust the feed rate of one or more of the feeders based on the discharge rate from the mixing system, the selected product formulation, or combinations thereof.

Illustrative embodiment 19 is a method for producing thermoplastic composition for roadway markings comprising charging a feed system comprising a plurality of feeders with components of the thermoplastic composition, discharging the components from the feeders at a determined feed rate, feeding the components to a mixing system, mixing and heating the components in the mixing system, and discharging the thermoplastic composition.

Illustrative embodiment 20 is the method of any preceding or subsequent illustrative embodiment, further comprising adjusting the feed rate of the components based on the discharge rate of the thermoplastic composition.

Illustrative embodiment 21 is the method of any preceding or subsequent illustrative embodiment, further comprising transporting the components from the feed system to the mixing system by a transport system comprising one or more of a pneumatic conveyer, belt conveyer, or bucket conveyer.

Illustrative embodiment 22 is the method of any preceding or subsequent illustrative embodiment, wherein the mixing system comprises a mixer and a smoothing system.

Illustrative embodiment 23 is the method of any preceding or subsequent illustrative embodiment, further comprising blending at least a portion of the components in the smoothing system prior and feeding the blended components to the mixer.

Illustrative embodiment 24 is the method of any preceding or subsequent illustrative embodiment, wherein the blending increases a uniformity of the thermoplastic composition.

Illustrative embodiment 25 is the method of any preceding or subsequent illustrative embodiment, wherein the thermoplastic composition is discharged to a finishing system.

Illustrative embodiment 26 is the method of any preceding or subsequent illustrative embodiment, further comprising at least one of applying a surface treatment, cooling the thermoplastic composition, or cutting the thermoplastic composition in the finishing system.

Illustrative embodiment 27 is the method of any preceding or subsequent illustrative embodiment, further comprising performing inline quality analysis and adjusting a feed rate of at least one component according to an inline quality analysis result.

Illustrative embodiment 28 is the method of any preceding or subsequent illustrative embodiment, further comprising heating the mixing system to a temperature of between 200° F. and 800° F.

Illustrative embodiment 29 is the method of any preceding or subsequent illustrative embodiment, further comprising heating the thermoplastic composition to a temperature of at least 150° F. in mixing system.

Illustrative embodiment 30 is the method of any preceding illustrative embodiment, wherein the components of the thermoplastic composition comprise:
at least 3 weight percent polypropylene/polyethylene copolymer;
at least 18 weight percent binder;
at least 20 percent intermix of inorganic filler; and
at least one of:
at least 1 weight percent of a polyethylene homopolymer wax,
at least 1 weight percent alkyd resin and soybean oil mixtures,
at least 0.5 weight percent of a UV stabilizing compound,
at least 1 weight percent of an alkyd resin modified glyceryl phthalate, or
at least 1 weight percent of a polyurethane.

Illustrative embodiment 31 is a system for producing thermoplastic material for roadway markings comprising: a feed system comprising a plurality of hoppers and conveyers, each hopper configured to discharge a raw material to a conveyer at determined rate according to a formulation; a transport system configured to receive the raw materials from the conveyers and transfer the raw materials to a smoothing system, wherein the smoothing system is configured to receive the raw materials from the transport system; and a mixer configured to receive the raw materials from the smoothing system, heat and combine the raw materials to produce a thermoplastic material, and discharge the thermoplastic material.

Illustrative embodiment 32 is the system of any preceding or subsequent illustrative embodiment, wherein the conveyers comprise at least one of a vibratory tray, a screw feeder, or a liquid feeder.

Illustrative embodiment 33 is the system of any preceding or subsequent illustrative embodiment, wherein a rate of discharge of at least one raw material is determined by a weight differential of the hopper over time Illustrative embodiment 34 is the system of any preceding or subsequent illustrative embodiment, wherein a rate of discharge of at least one raw material is determined by volumetric flowrate.

Illustrative embodiment 35 is the system of any preceding or subsequent illustrative embodiment, wherein the conveyer comprises a plurality of buckets or a belt.

Illustrative embodiment 36 is the system of any preceding or subsequent illustrative embodiment, wherein the smoothing system comprises an agitator to blend the raw materials prior to discharging the raw materials to the mixer.

Illustrative embodiment 37 is the system of any preceding or subsequent illustrative embodiment, wherein the mixer heats the raw materials to at least 200° F.

Illustrative embodiment 38 is the system of any preceding or subsequent illustrative embodiment, wherein the mixer is a twin screw mixer.

Illustrative embodiment 39 is the system of any preceding or subsequent illustrative embodiment, wherein the mixer comprises multiple heating zones.

Illustrative embodiment 40 is the system of any preceding or subsequent illustrative embodiment, further comprising an extruder configured to receive the discharged thermoplastic material.

Illustrative embodiment 41 is the system of any preceding or subsequent illustrative embodiment, further comprising an accumulator.

Illustrative embodiment 42 is a method for producing thermoplastic composition for roadway markings comprising: charging a feed system comprising a plurality of hoppers and conveyers with components of the thermoplastic composition; discharging the components at determined rate onto a transport conveyer; transferring the components from the feed system to a smoothing system; blending the components to increase uniformity of the composition; transferring the blended components to a mixer; mixing and heating the components in the mixer; and discharging the thermoplastic composition to a finishing system.

Illustrative embodiment 43 is the method of any preceding or subsequent illustrative embodiment, wherein the mixer is heated to a temperature of between 200° F. and 800° F.

Illustrative embodiment 44 is the method of any preceding or subsequent illustrative embodiment, wherein the components of the thermoplastic composition comprise: at least 3 weight percent polypropylene/polyethylene copolymer; at least 18 weight percent binder; at least 20 percent intermix of inorganic filler; and at least one of the following: at least 1 weight percent of a polyethylene homopolymer wax, at least 1 weight percent alkyd resin and soybean oil mixtures, at least 0.5 weight percent of a UV stabilizing compound, at least 1 weight percent of an alkyd resin modified glyceryl phthalate, or at least 1 weight percent of a polyurethane.

Illustrative embodiment 45 is the method of any preceding or subsequent illustrative embodiment, wherein a discharge rate of the components is controlled by change in weight of the hopper or a volumetric flowrate.

Illustrative embodiment 46 is the method of any preceding or subsequent illustrative embodiment, further comprising performing inline quality analysis in the finishing system and adjusting discharge rate of at least one component according to an inline quality analysis result.

While this specification describes the composition being applied to a roadway, a person of ordinary skill in the art would understand that the compositions can be applied to other substrates. Some non-limiting examples of substrates include pavement, roads, parking lots, parking decks, parking blocks, traffic blocks, ramps, bridges, airport runways, docks, tunnels, sidewalks, parks, plazas, green spaces, decorative spaces, floor surfaces, walls, ceilings, and doors. Typical but non-limiting examples of substrate materials include asphalt, concrete, and cement.

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted.

As used herein, the meaning of "a," "an," and "the" includes singular and plural references unless the context clearly dictates otherwise.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

That which is claimed:

1. A system for continuously producing thermoplastic material for roadway markings, the system comprising:
   a feed system comprising a plurality of feeders, each feeder configured to discharge a material at a feed rate according to a selected product formulation;
   a mixing system configured to receive, heat, and combine the materials to produce a thermoplastic material, and discharge the thermoplastic material at a determined discharge rate; and
   a control system configured to monitor process performance, product quality parameters, or combinations thereof, and adjust the feed rate of one or more of the feeders based on the discharge rate from the mixing system, the selected product formulation, or combinations thereof,
   wherein the mixing system comprises a mixer and a smoothing system comprising a vibratory conveyer or screw conveyer, and
   wherein the smoothing system is configured to receive the materials from the feed system and feed the materials to the mixer.

2. The system of claim 1, wherein each feeder comprises a vibratory conveyer, a screw conveyer, or a liquid charge line.

3. The system of claim 1, wherein the feed rate of at least one material is controlled by a weight differential of the feeder over time.

4. The system of claim 1, wherein the feed rate of at least one material is controlled by a volumetric flowrate from the feeder.

5. The system of claim 1, further comprising a transport system configured to receive the materials from the feed system and transport the materials to the mixing system.

6. The system of claim 5, wherein the transport system comprises a plurality of buckets, a belt conveyer, or a pneumatic conveyer.

7. The system of claim 1, wherein the mixer comprises a single screw mixer or a twin screw mixer.

8. The system of claim 1, wherein the mixer comprises more than one heating zone.

9. The system of claim 1, wherein the mixing system heats the materials to a temperature of 150° F. to 450° F.

10. The system of claim 1, further comprising a finishing system configured to receive the discharged thermoplastic material from the mixing system.

11. A method for continuously producing thermoplastic composition for roadway markings comprising:
    charging a feed system comprising a plurality of feeders with components of the thermoplastic composition;
    discharging the components from the feeders at a determined feed rate;
    feeding the components to a mixing system, wherein the mixing system comprises a mixer and a smoothing system;
    mixing and heating the components in the mixing system;
    blending at least a portion of the components in the smoothing system prior and feeding the blended components to the mixer;
    discharging the thermoplastic composition; and performing inline quality analysis and adjusting a feed rate of at least one component according to an inline quality analysis result.

12. The method of claim 11, further comprising adjusting the feed rate of the components based on the discharge rate of the thermoplastic composition.

13. The method of claim 11, further comprising transporting the components from the feed system to the mixing system by a transport system comprising one or more of a pneumatic conveyer, belt conveyer, or bucket conveyer.

14. The method of claim 11, further comprising heating the mixing system to a temperature of between 200° F. and 800° F.

15. The method of claim 11, wherein the components of the thermoplastic composition comprise:
- at least 3 weight percent polypropylene/polyethylene copolymer;
- at least 18 weight percent binder;
- at least 20 percent intermix of inorganic filler; and
- at least one of:
    - at least 1 weight percent of a polyethylene homopolymer wax,
    - at least 1 weight percent alkyd resin and soybean oil mixtures,
    - at least 0.5 weight percent of a UV stabilizing compound,
    - at least 1 weight percent of an alkyd resin modified glyceryl phthalate, or
    - at least 1 weight percent of a polyurethane.

* * * * *